United States Patent [19]

Carmona et al.

[11] Patent Number: 4,966,729

[45] Date of Patent: Oct. 30, 1990

[54] MATERIAL HAVING A RESISTIVITY WITH A POSITIVE TEMPERATURE COEFFICIENT

[75] Inventors: François Carmona, Gradignan; Jacques Maire; Héléne Septier, both of Paris; Roland Canet, Lormont; Pierre Delhaes, Gradignan, all of France

[73] Assignee: Le Carbone-Lorraine, Paris, France

[21] Appl. No.: 177,415

[22] Filed: Apr. 4, 1988

[30] Foreign Application Priority Data

Apr. 15, 1987 [FR] France ................. 87 05781

[51] Int. Cl.$^5$ ............................................. H01B 1/06
[52] U.S. Cl. .................................... 252/511; 252/503; 252/506; 252/512; 252/516; 252/518; 252/504; 523/468; 523/457; 523/458; 523/459; 523/513; 524/495; 524/496; 524/401; 524/439
[58] Field of Search .............. 252/511, 503, 506, 512, 252/518, 513, 579, 504; 523/457, 459, 468, 513; 524/495, 496, 401, 439

[56] References Cited

U.S. PATENT DOCUMENTS

| | | | |
|---|---|---|---|
| 4,557,860 | 12/1985 | DiSalvo et al. | 252/512 |
| 4,568,592 | 2/1986 | Kawaguchi et al. | 252/511 |
| 4,600,602 | 7/1986 | Martin et al. | 524/495 |
| 4,664,971 | 5/1987 | Soens | 252/511 |
| 4,692,272 | 9/1987 | Goswami et al. | 523/458 |

*Primary Examiner*—Josephine Barr
*Attorney, Agent, or Firm*—Dennison, Meserole, Pollack & Scheiner

[57] ABSTRACT

The invention relates to an electrically conductive, polymer based material with electrical resistivity having a positive temperature coefficient. The material comprises a matrix of thermosetting polymer having conductive particles in the form of fibers distributed through the polymer. The polymer can be an epoxy resin, polyimide, unsaturated polyester, silicone, polyurethane or phenolic resin, and the fibers can be carbon fibers, carbon fibers coated with metal or metal alloy, graphite fibers, graphite fibers coated with metal or metal alloy, graphite intercalation compound fibers, metal fibers, ceramic fibers, or ceramic fibers coated with a metal or metal alloy.

6 Claims, 5 Drawing Sheets

MATERIAL HAVING A RESISTIVITY WITH A POSITIVE TEMPERATURE COEFFICIENT

OBJECT OF THE INVENTION

The present invention relates to a material having an electrical resistivity with a positive temperature coefficient (PTC), its preparation and its applications.

STATE OF THE ART

It is known that plastic materials must be rendered electricity conducting by incorporating into them appropriate quantities of divided particles. These "conductive" plastic materials do not all have a positive temperature coefficient. Up to now, in this particular field, research has mainly been directed at thermoplastic polymers. Thus, reference can be made to particular compositions constituted by certain thermoplastic polymers and conductive particles, of carbon black, such as e.g. in French Pat. Nos. 2 374 357, 2 423 037 and 2 443 123, of metal, such as e.g. in published Japanese patent application Nos. 60 31540 or 57 12061, or French Pat. No. 2 321 751 and of carbon fibres, such as e.g. in published Japanese patent application Nos. 57 12061 and 59 196334.

DISADVANTAGES OF PTC THERMOPLASTIC POLYMERS

Thermoplastic polymers in this field suffer from the disadvantages that they become soft at high temperature and are not easy to produce, because it is not possible to work at ordinary temperature, particularly during the mixing and dispersion of the conductive particles.

The main objective of the invention is to obviate these disadvantages whilst still retaining a material with the same qualities.

OBJECT OF THE INVENTION

According to the invention the material with electrical resistivity and a positive temperature coefficient is constituted by a matrix of plastic particles and electricity conducting particles dispersed in the matrix and is characterized in that the plastic material of the matrix is a thermosetting resin.

FIG. 1 shows the relationship between the resistivity $\rho$ in ohm-centimeter, the temperature T and the concentration $\phi$ of conductive particles.

FIG. 2 shows the variation of $\rho$ as a function of $\phi$ (as %), according to a first embodiment.

FIG. 3 shows the variation of the resistivity $\rho$ as a function of the temperature in two directions, namely perpendicular and parallel to the plane of the sample.

FIG. 4 shows the influence of the length of the fibres on the resistivity $\rho$.

FIG. 5 shows the variation, as a function of time, of the intensity of the current in a sample having a cold resistance of 6 ohms.

FIG. 6 shows the thermal variations of the resistivity as a function of the fibre volume concentration.

FIG. 7 shows the variation of the ohmic resistance of a sample as a function of the temperature.

Figure 8:
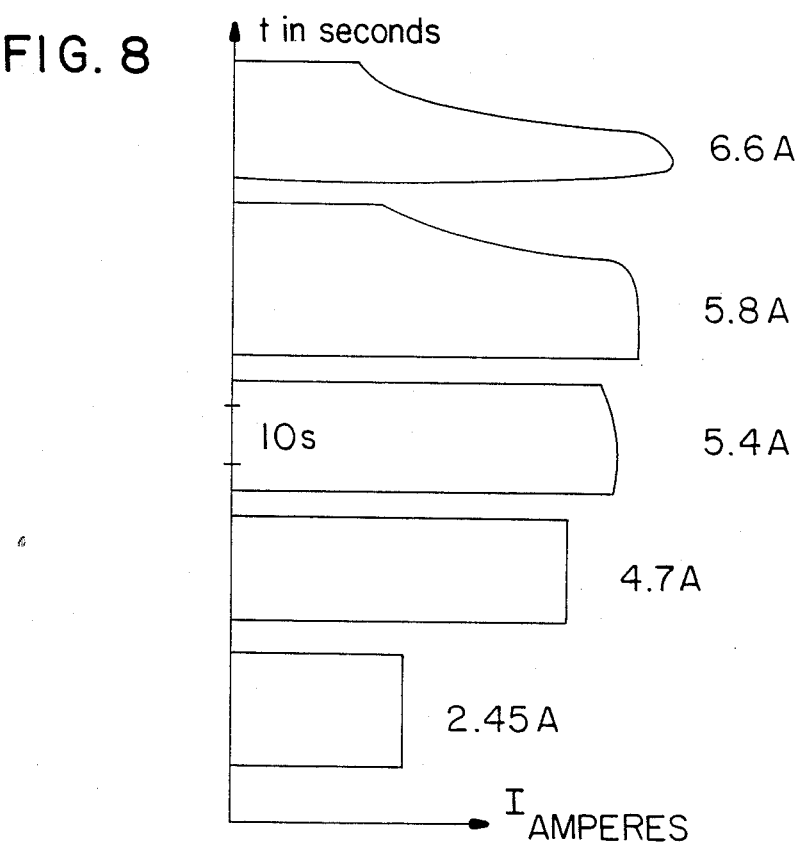
Figure 9:
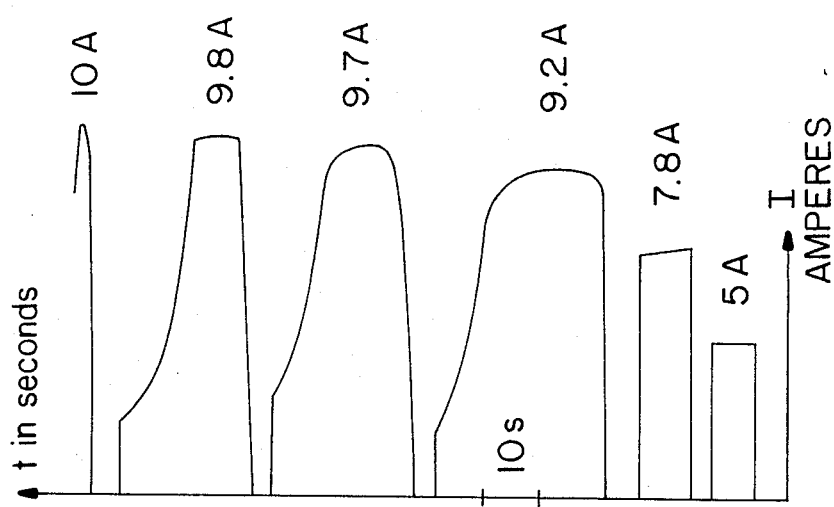

FIGS. 8 and 9 show the response to cyclic overcurrents for samples having nominal resistances, when cold, of respectively 0.27 and 0.25 ohm.

Figure 10:
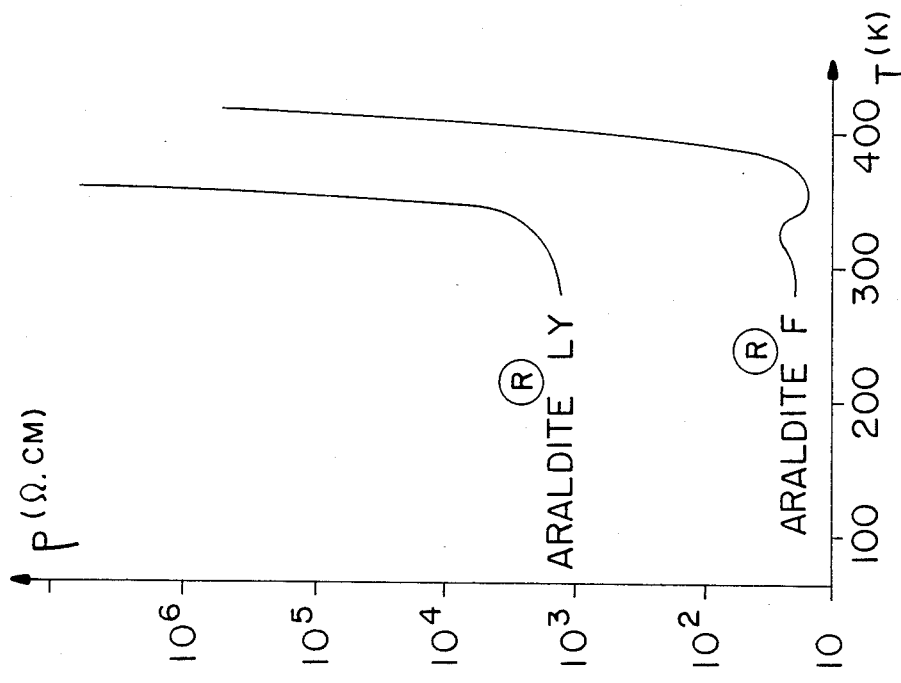

FIG. 10 the influence of the nature of the Araldite matrix on the resistivity $\rho$.

PERFORMANCE OF THE INVENTION

The thermosetting resin can be chosen from among epoxy resins, polyimides, unsaturated polyesters, silicones, polyurethanes and phenolic resins.

According to the invention, the conductive particles preferably have a large size (> 1 $\mu$m), are in fibrous form, the fibres having a diameter of approximately 10 $\mu$m and of length between 1 and 3 mm.

They can be of carbon or graphite, carbon or graphite coated with metal (such as nickel) or a metal alloy, of a compound for the insertion of graphite, metal or metal alloy, such as nickel, copper, constantan, etc. or of ceramic materials, such as silicon carbide, coated or not coated with metal or metal alloy. The optionally used carbon fibres can be obtained by carbonizing fibres with precursor ex-mesophase pitch or polyacrylonitrile or by the vapour deposition of hydrocarbons. They an be used as such or after graphitization.

The choice of these materials, as well as the dimensions of the particles and their proportion in the matrix are essentially a function of the sought effect.

Different tests have been carried out using the same thermosetting resin and the same conductive particles with variable volume concentrations $\phi$. By measuring the electrical resistivity of these various materials at ordinary temperature and the thermal variation of said resistivity, it is found that there is a conduction threshold for a critical concentration $\phi$ and a maximum concentration for which the material has a PTC remaining acceptable.

Figure 1:
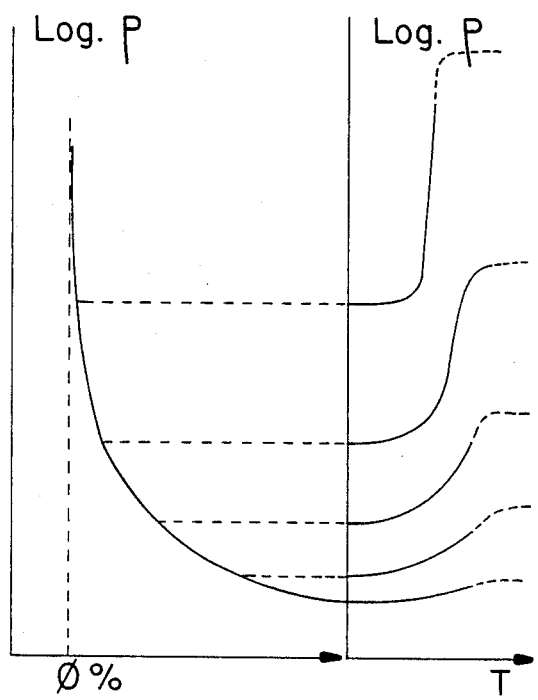
FIGS. 1 to 10 illustrate the realization of the invention.

The curves of FIG. 1, in which $\rho$ represents the resistivity, T the temperature and $\phi$ the concentration of conductive particles illustrate this double finding.

Consequently, it can be seen that if the envisaged application requires a relatively high intensity, the thermosetting resin/conductive particle combination which is most suitable will be adopted, together with the conductive particle concentration close to the maximum concentration, so as to have on the one hand the smallest resistance at ordinary temperature and on the other hand an acceptable PTC.

PREPARATION

One of the preparation methods for the PTC material according to the invention essentially comprises mixing an dispersing the conductive particles in resin in the viscous state in the presence of its hardener and possible adjuvants, degassing the mixture obtained, shaping the degassed mixture, subjecting the shaped mixture to a heat treatment (to harden the resin) and subjecting the shaped, thermoset material to an annealing operation at a temperature above the polymerization temperature.

The temperature of the mixture and the dispersion of the particles is a function of the resin chosen. The dispersion of the particles can take place by any appropriate means. Thus, it can be mechanical. It is merely necessary to ensure that there is no particle breakage, particularly when they are in the form of fibres. Shaping generally takes place by casting the viscous mixture in appropriate moulds which can have various shapes, e.g. cylindrical, parallelepipedic, etc.

Heat treatment takes place at a temperature and for a time which are a function of the chosen resin, i.e. with an Araldite LY resin 45° C. for 2 hours and with an Araldite F resin 110° C. for 16 hours (N. B. Araldite LY and Araldite F are registered trade marks of CIBA-GEIGY A.G.).

The annealing conditions are essentially a function of the chosen application and therefore, inter alia, of the chosen resin.

The following non-limitative examples serve to illustrate the invention.

EXAMPLE 1

In this example, the chosen resin is an Araldite LY epoxy resin and the conductive particles are carbon fibres of length 1 mm and diameter 9 μm.

In accordance with the process described hereinbefore, several samples are prepared with volume concentrations $\phi$ of different fibres. Shaping takes place by casting bars and the annealing operation is performed at 80° C. for 2 hours.

Figure 2:
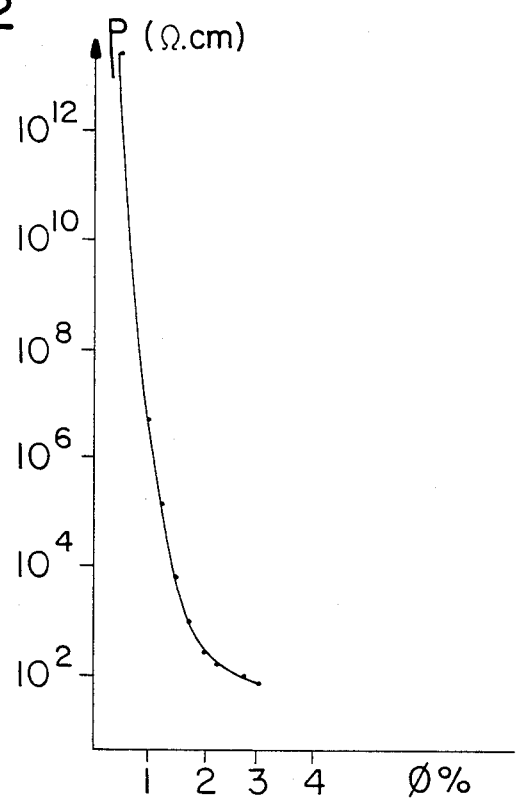

Samples are taken from the finally obtained bars and for each of them the resistivity $\rho$ is measured as a function of the concentration $\phi$. The result of these measurements is given in FIG. 2.

For each of the samples, the resistivity is also measured as a function of the temperature and it is found that the critical concentration is in this case approximately 1.75%.

EXAMPLE 2

In this example, a sample is prepared with the same materials and according to the same process as in example 1 except that the concentration $\phi$ is fixed at 1.75% and shaping takes place by the direct casting of a 3 mm thick plate from which a sample is cut.

Figure 3:
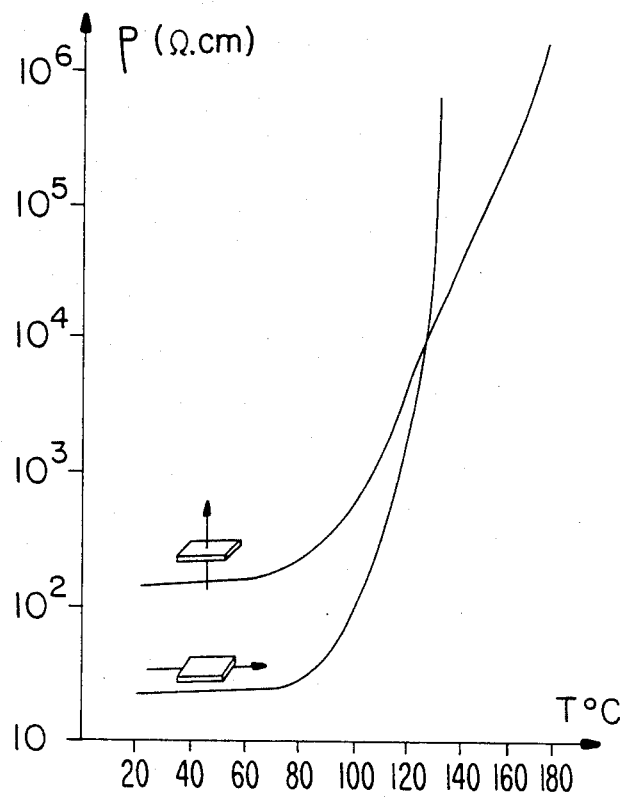

The resistivities of the sample are measured in two directions, parallel and perpendicular to its plane, as a function of the temperature. The results of the measurements are given in FIG. 3 and there is a resistivity anisotropy and the PTC effect is substantially the same in both directions.

This material can be suitable as an electrical safety device for low intensities of approximately a few mA.

EXAMPLE 3

In the same way as described in example 1, samples are prepared which contain carbon fibres respectively of lengths 1 and 3 mm with the same concentration of approximately 1.75%.

Figure 4:
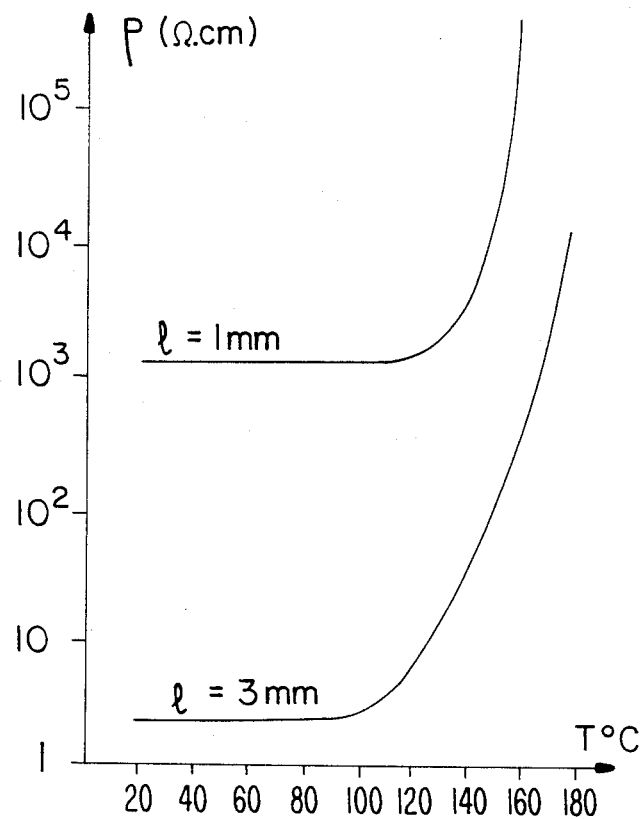

On comparing the resistivity of the material with 3 mm fibres with that of the material with 1 mm fibres, it is found that for a constant fibre volume concentration, the former is lower than the second, as is shown in FIG. 4, which gives the thermal variations of the resistivities of materials containing 1.75% of carbon fibres of respective lengths 1 and 3 mm. The reduction of the resistivity is more than a factor of 100 and is only accompanied by a slight reduction of the PTC effect.

Figure 5:
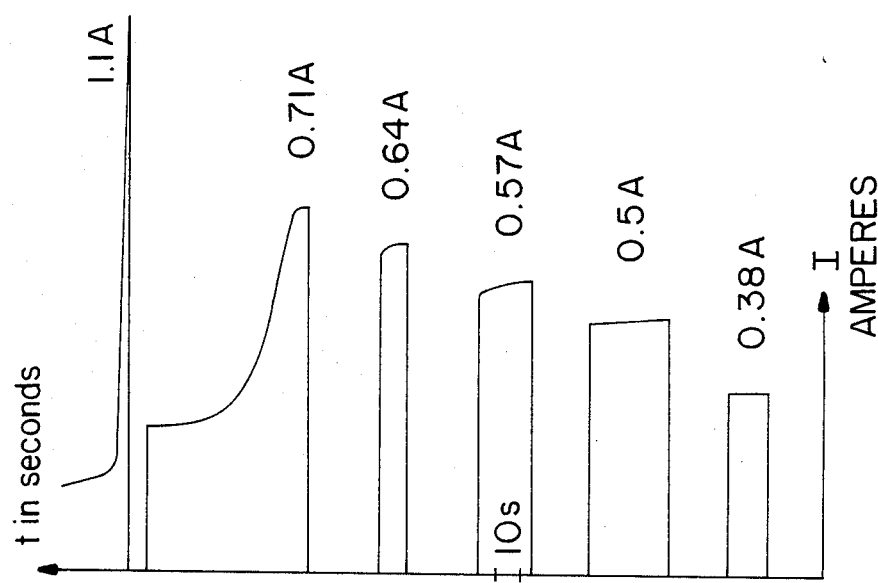

The advantage of materials with 3 mm fibres compared with those with 1 mm fibres is apparent. Thus, when using the material with 3 mm fibres a safety device is produced and for a sample with a nominal cold resistance equal to 6 ohms and FIG. 5 shows the variation over time of the current passing through it when voltage surges are applied to it. It can be seen that the device has good breaking properties at currents slightly below 1 ampere.

EXAMPLE 4

This example is a variant of the preceding examples. The conductive particles are in this case nickel-coated carbon fibres having a diameter of 9 μm, a nickel thickness of 0.25 μm and an average length of 1.4 mm.

Figure 6:
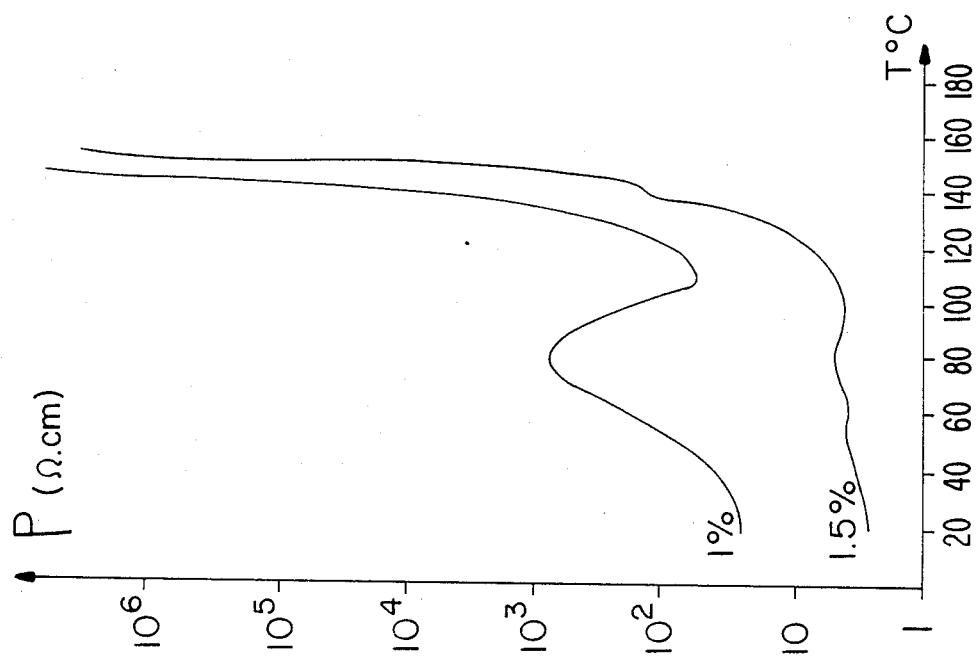

The thermal variations of the resistivity of two materials respectively having volume concentrations of nickel-coated carbon fibres of 1 and 1.5% are measured. These variations are shown in FIG. 6. It can be seen that there is an excellent PTC effect associated with remarkably low cold resistivities compared with the resistivities of materials containing carbon fibres with a comparable PTC effect. The material containing 1% of fibres has an abnormal cold behaviour, which would appear to disappear with a higer concentration.

Figure 7:
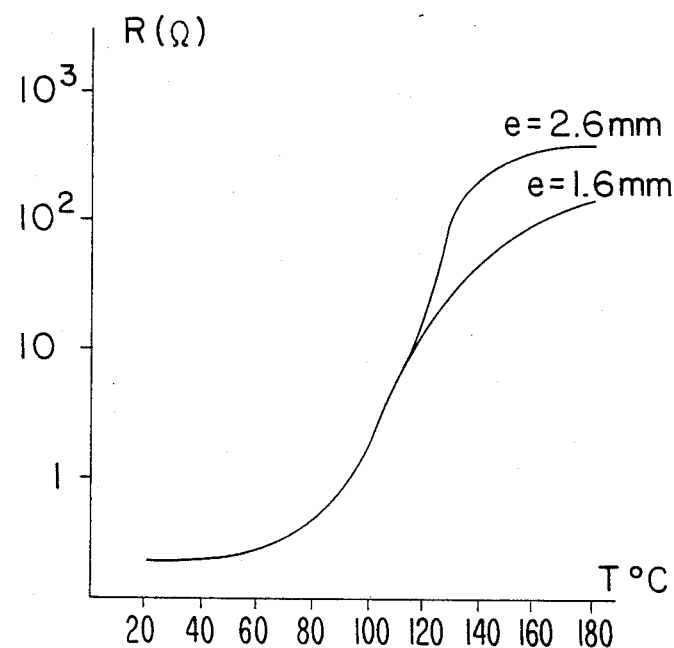

In addition, measurement takes place of the thermal variations of the resistance of two thin samples (1.6 and 2.6 mm) of material containing 1.6% of fibres. The resistances when cold are approximately 0.4 ohm and multiplied by 1,000 when hot, as shown in FIG. 7.

Finally, FIGS. 8 and 9 show the results of dynamic tests in response to overcurrents carried out on material samples containing 1.3% of fibres. The cold resistances of the samples are respectively 0.27 and 0.25 ohm. In both cases, the cold resistance is retained up to currents of approximately 5 amperes, the effect of the current reduction appearing clearly at about 6 and 9 amperes respectively, the reference resistance in the circuit being 2.5 ohm in the first case and 0.5 ohm in the second.

These examples illustrate that with the same basic thermosetting resin, but with different conductive particles as regards their nature and their dimensions, with different volume concentrations and with different shaping procedures, it is possible to obtain materials having different behaviour characteristics, which can be adapted to the envisaged applications.

This also applies in the case of other conductive particles and/or other thermosetting resins, as is shown by example 5.

EXAMPLE 5

In this example, two samples with Araldite LY and Araldite F epoxy resins are prepared and contain in both cases 2% by volume of diameter 9 μm, length 1 mm graphite fibres. Preparation takes place as indicated hereinbefore.

The sample with the Araldite LY matrix undergoes an annealing operation at 80° C. for 2 hours and that with an Araldite F matrix undergoes an annealing operation at 140° C. for 20 hours. The resistivity $\rho$ as a function of the temperature T is then measured on both samples. The results are given in FIG. 10. It can be seen that for the same temperature, the resistivity of the Araldite LY matrix material is higher than that of the Araldite F matrix material, which is due to the fact that the critical concentration $\phi$ is lower in the second case than in the first and that the PTC effect appears in the second material at a higher temperature than in the first.

This example clearly reveals the influence of the nature of the polymer used.

We claim:

1. Electrically conductive, polymer based material with electrical resistivity having a positive temperature coefficient, comprising:

(a) a matrix of a thermosetting polymer selected from the group consisting of epoxy resins, polyimides, unsaturated polyesters, silicones, polyurethanes and phenolic resins; and said material having electrically resistivity which is substantially constant from about 20° C. up to a defined temperature, and which increases rapidly above the defined temperature.

2. Material according to claim 1, wherein the fibres have a diameter of approximately 10 μm and a length of 1 to 3 mm.

3. Material according to claim 1, wherein said fibers are graphite fibers, coated with nickel or copper.

4. Material according to claim 1, wherein said ceramic fibers are silicon carbide fibers.

5. Electrically conductive, polymer based material comprising:

(a) a matrix of a thermosetting polymer selected from the group consisting of epoxy resins, polyimides, unsaturated polyesters, silicones, polyurethanes and phenolic resins; and (b) 1 to 3% by volume conductive particles distributed through the matrix, said particles in the form of fibers of length 1-3 mm selected from the group consisting of carbon fibers, carbon fibers coated with metal or metal alloy, graphite fibers, graphite fibers coated with metal or metal alloy, graphite intercalation compound fibers, metal fibers, ceramic fibers, and ceramic fibers coated with a metal or metal alloy, said material having electrically resistivity which is substantially constant from about 20° C. up to a defined temperature, and which increases rapidly above the defined temperature.

6. Material according to claim 5, wherein the defined temperature is about 80°–120° C.

* * * * *

UNITED STATES PATENT AND TRADEMARK OFFICE
CERTIFICATE OF CORRECTION

PATENT NO. : 4,966,729
DATED : October 30, 1990
INVENTOR(S) : Carmona et al

It is certified that error appears in the above-identified patent and that said Letters Patent is hereby corrected as shown below:

Claim 1, column 4, cancel lines 67 and 68, and column 5, cancel lines 1 and 2, and replace with the following:

--(b) 1 to 3% by volume conductive particles distributed through the matrix, said particles in the form of fibers of length 1-3 mm selected from the group consisting of carbon fibers, carbon fibers coated with metal or metal alloy, graphite fibers, graphite fibers coated with metal or metal alloy, graphite intercalation compound fibers, metal fibers, ceramic fibers, and ceramic fibers coated with a metal or metal alloy.--

Signed and Sealed this
Fifth Day of May, 1992

Attest:

DOUGLAS B. COMER

Attesting Officer    Acting Commissioner of Patents and Trademarks